(12) United States Patent
Percec

(10) Patent No.: US 6,284,850 B1
(45) Date of Patent: Sep. 4, 2001

(54) POLYMERIZATION OF VINYL MONOMERS

(75) Inventor: Virgil Percec, Hunting Valley, OH (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 09/297,472

(22) PCT Filed: Oct. 29, 1997

(86) PCT No.: PCT/US97/19685

§ 371 Date: Apr. 29, 1999

§ 102(e) Date: Apr. 29, 1999

(87) PCT Pub. No.: WO98/20050

PCT Pub. Date: May 14, 1998

Related U.S. Application Data
(60) Provisional application No. 60/029,968, filed on Nov. 1, 1996.

(51) Int. Cl.[7] ....................................................... C08F 4/00
(52) U.S. Cl. ...................... 526/146; 526/234; 526/347.1; 526/348; 526/317.1
(58) Field of Search .................................... 526/146, 234, 526/347.1, 348, 317.1

(56) References Cited

PUBLICATIONS

Percec et al., Macromolecules, 28, 7970–7972, Nov. 1995.*
Wang et al., Macromolecules, 28, 7901–7910, Nov. 1995.*
Kato et al., Macromolecules, 28, 1721–1723, Feb. 1995.*
Orochov et al., J. Chem. Soc. (B), 255–259, 1969.*
Percec et al., Macromolecules, 29, 3665–3668, 1996.*

* cited by examiner

Primary Examiner—David W. Wu
Assistant Examiner—Ling-Siu Choi
(74) Attorney, Agent, or Firm—Hilmar L. Fricke; Steven C. Benjamin

(57) ABSTRACT

Free radically polymerizable monomers may be polymerized using as an initiator a combination of a selected arylsulfonyl halide or alkylsulfonyl halide and a selected compound containing a lower valent transition metal atom. These polymerizations are sometimes living polymerizations, allowing control of polymer structure such as producing block copolymers and/or polymers with narrow molecular weight distributions. Useful monomers include styrenes and (meth)acrylate esters and amides. The products are useful as molding resins, for glazing, as film forming binders in coating compositions and have numerous other uses.

18 Claims, No Drawings

POLYMERIZATION OF VINYL MONOMERS

This application claims benefit of provisional application Ser. No. 60/029,968, files Nov. 1, 1996.

FIELD OF THE INVENTION

A combination of a selected arylsulfonyl halide or alkylsulfonyl halide and a compound containing a lower valent transition metal atom can be used to initiate free radical polymerizations of vinyl monomers such as (meth)acrylates and styrenes and under certain conditions, these polymerizations may be living.

TECHNICAL BACKGROUND

Polymers of so-called vinyl monomers made by free radical polymerization are important items of commerce, for instance poly(methyl methacrylate) is used as a glazing material and molding resin, while polystrene is useful in packaging as a film, in foam form as in drinking cups, and as a molding resin. Therefore, new polymerization systems for these types of monomers are always of interest, especially when such polymerizations may provide improved or easier control over the microstructure and/or molecular weight of the polymer produced.

V. Percec et al., Macromolecules, vol. 28, p. 7970–7972 (1995), V. Percec et al., Macromolecules, vol. 29, p. 3665–3668 (1996), B. Barbiou, et al., Abstract of the 36$^{th}$ IUPAC International Symposium on Macromolecules, Aug. 4–9, 1996, Seoul Korea, p. 671, ibid. p. 672, V. Percec, et al., Abstract of the 36$^{th}$ IUPAC International Symposium on Macromolecules, p. 68, and V. Percec, et al., Polym. Prepr., vol. 38, No. 1, p. 733–735 (1997), report on the homopolymerization of styrene and other monomers using a combination of an arylsulfonyl chloride and a transition metal compound. Some of these polymerizations are reported to be "living". All of these articles are hereby included by reference.

M. Asscher, et al., J. Chem. Soc. (1964) p. 4962–4971 report the reaction of various aryl sulfonyl chlorides or alkyl sulfonyl chlorides and copper chloride with various olefins such as styrene. No polymers are reported to be products.

A. Orochov, et al., J. Chem. Soc. (1969) p. 255–259 report on the reaction of cupric chloride with an aryl sulfonyl chloride in the presence of styrene. No polymers are reported.

SUMMARY OF THE INVENTION

This invention concerns a process for the polymerization of vinyl monomers, comprising, contacting a free radically polymerizable vinyl monomer with a first compound of the formula $A^1SO_2X$ and a second compound which contains a transition metal atom in a lower valent state, wherein $A^1$ is an aryl, substituted aryl, alkyl or substituted alkyl group, and X is chlorine, bromine or iodine.

DETAILS OF THE INVENTION

Free radically polymerizable vinyl monomers are well known in the art. By a vinyl monomer herein is meant a compound of the formula

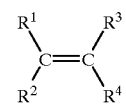

wherein $R^1$, $R^2$, $R^3$ and $R^4$ are hydrogen, hydrocarbyl, substituted hydrocarbyl or a functional group, and at least one of $R^1$, $R^2$, $R^3$ and $R^4$ is not hydrogen or alkyl. For a discussion of free radically polymerizable vinyl monomers see for instance H. Mark, et al., Ed., Encyclopedia of Polymer Science and Engineering, 2nd Ed., Vol. 13, John Wiley & Sons, New York, 1988, p. 708–713, which is hereby included by reference. Suitable vinyl monomers include various vinyl halides such as vinyl chloride, vinyl fluoride and vinylidene fluoride, selected vinyl ethers such as methyl vinyl ether, chloroprene, isoprene, styrene and substituted styrenes, acrylic esters, methacrylic esters, acrylamides, methacrylamides, and substituted acrylic and methacrylic esters and amides such as 2-chloroethyl methacrylate, 2-methoxyethyl methacrylate, 2-hydroxyethyl (meth)acrylate, 3-hydroxypropyl (meth)acrylate, 4-hydroxybutyl (meth)acrylate, 2-aminoethyl (meth)acrylamide and the like.

Preferred vinyl monomers include styrenes and a compound of the formula

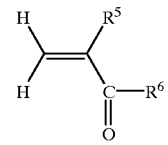

wherein $R^5$ is hydrogen or methyl and $R^6$ is —$NR^7R^8$ or —$OR^9$. $R^7$ and $R^8$ are each independently hydrogen, hydrocarbyl or substituted hydrocarbyl, and $R^9$ is hydrocarbyl or substituted hydrocarbyl. It is preferred that $R^7$ and $R^8$ are each independently hydrogen or alkyl containing 1 to 10 carbon atoms, or $R^9$ is alkyl containing 1 to 10 carbon atoms, more preferred that $R^9$ is methyl.

By "a styrene" herein is meant a compound of the formula

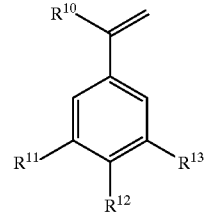

wherein $R^{10}$ is hydrogen or methyl, and $R^{11}$, $R^{12}$ and $R^{13}$ are each independently hydrogen, hydrocarbyl, substituted hydrocarbyl or a functional group. It is preferred that all of $R^{10}$, $R^{11}$, $R^{12}$ and $R^{13}$ are hydrogen.

In these polymerizations, only one olefin may be present to form a homopolymer, or more than one olefin may be present to form a copolymer. If only one monomer is present it is preferred that it is not styrene. If more than one polymerizable monomer is present at one time a random or alternating copolymer may be formed. Random copolymers are preferred products of the process. Some combinations of monomers may not free radically copolymerize while others will copolymerize. Such combinations are also well known in the art. Also, copolymers of olefins which do not readily homopolymerize under free radical conditions may be prepared using a more readily polymerizable monomer. An example of such monomer a combination is tetrafluoroethylene and ethylene.

By hydrocarbyl herein a meant a group containing carbon and hydrogen. By "substitued" (such as substituted hydrocarbyl or substituted aryl) is meant a group containing an inert substituent group, such as halo, ether, ester, etc. By inert is meant the group does not interfere with the polymerization process described herein. Unless otherwise specified it is preferred that any hydrocarbyl or alkyl groups herein contain 1 to 30 carbon atoms, and any aryl groups contain 6 to 30 carbon atoms. By an aryl group herein is meant a monovalent radical whose free valence is to a carbon atom of an aromatic ring. It is preferred that such rings are carbocyclic. An aryl group may contain a single ring, 2 or more fused rings, or 2 or more aromatic rings connected by covalent bonds. By a functional group herein is meant an inert functional group that does not interfere with the polymerization process described herein. Examples of such groups include alkoxy, aryloxy, ester, amido and halo.

One part of the polymerization system in the present process is an arylsulfonyl halide or an alkyl sulfonyl halide of the formula $A^1SO_2X$ wherein $A^1$ is an aryl, substituted aryl group, an alkyl group or a substituted alkyl group, and X is chlorine, bromine or iodine. It is preferred that X is chlorine, and/or that $A^1$ is phenyl, substituted phenyl or methyl. Suitable substituents include one or more of nitro, fluoro, chloro, alkyl, alkoxy, carboxy, hydroxy and dialkylamino. It is more preferred that $A^1$ is phenyl or p-methoxyphenyl or methyl. Included within the meaning of arylsulfonyl halide or alkylsulfonyl halide halide is any adduct, such as a 1:1 adduct, which is a reaction product of an aryl or alkyl sulfonyl halide and any polymerizable vinyl monomer. In effect, such an adduct is one of the initial products in the polymerization process itself.

Another component of the polymerization process system is a compound containing a lower valent transition metal atom. By this is meant a compound containing at least one transition metal atom that is capable of existing in a (being oxidized to a) higher valent state. Included within the definition of a compound containing a transition metal atom in a lower valent state is a compound or combination of compounds that under the polymerization process conditions can form in situ the desired compound containing a transition metal atom in a lower valent state. In some cases this can include metal itself (or an alloy or a metal oxide thereof) which can either be dissolved or slightly dissolve in the process medium. In another instance, $CuCl_2$ is reported to form CuCl in the presence of styrene [M. Asscher, et al., J. Chem. Soc. (1963), p. 1887], so addition of $CuCl_2$ to a polymerization in which styrene was present would fulfill the requirement for the presence of a lower valent metal.

Suitable lower valent metals include Cu[I], Ru[I], Ni[II], Fe[II], Pd[II], Cu[0], Ni[0], Fe[0], Pd[0] and Rh[II], and Cu[I], Ru[I] and Rh(II) are preferred, and Cu[I] is especially preferred. The transition metal compound should preferably be at least slightly soluble in the polymerization medium. Optionally, the transition metal compound which is added may be solubilized by the addition of certain complexing agents. For example, CuCl may be solubilized by the addition of a 2,2'-bipyridine to the process medium, or may be added directly as a 2,2'-bipyridine-type complex. Other useful transition metal compounds are $RhCl[P(C_6H_5)_3]_3$ and $RuCl_2[P(C_6H_5)_3]_3$.

The molar ratio of lower valent transition metal compound:arylsulfonyl halide or alkyl sulfonyl halide is not critical, but it is preferred that it be greater than 0.2, more preferably greater than 0.5, especially if a living polymerization is desired. It is also preferred that this ratio not be over 5, and more preferably be less than 2.

It is preferred that the polymerization be carried out in a liquid medium, for instance a solvent (for some or all of the starting materials and optionally the polymer) may be added, or the polymerization may be carried out in neat liquid monomer(s) (in bulk). In these bulk polymerizations, conversion to polymer may be limited by increasing viscosity or by formation of "solid" polymer. Useful liquids include aromatic hydrocarbons such as a xylene, and ethers such as 1,4-dioxane and anisole.

It is preferred to carry out the polymerization at a temperature of about 0° C. to about 200° C., preferably about 50° C. to about 175° C. and more preferably about 75° C. to about 150° C. The upper temperature should not be above the temperature at which significant thermal decomposition of the polymer occurs. Such temperatures are well known for many free radically polymerizable monomers, and are otherwise readily determined.

Since arylsulfonyl halides and alkylsulfonyl halides are hydrolyzed slowly by water, the process can be run under wet conditions. Oxygen may affect free radical polymerizations, so it is also preferred that it be absent. Both of these objectives can be conveniently met by carrying out the polymerization process under an inert atmosphere, such as nitrogen, and starting with dry and deoxygenated ingredients.

The polymerization process described herein may be carried out using methods known to the artisan, see for instance H. Mark, et al., Ed., Encyclopedia of Polymer Science and Engineering, 2nd Ed., Vol. 12, John Wiley & Sons, New York, 1988, p. 504–555. For instance, these polymerizations may be carried out in a batch, semi-batch or continuous manner.

Sometimes the free radical polymerization of olefinic monomers using an aryl or alkyl sulfonyl halide and a lower valent metal compound may possess characteristics of so-called "living" or "controlled" polymerization processes. Such processes can lead to polymers with narrow molecular weight distributions (Mw/Mn<2), as illustrated in Examples 1–6, and may permit formation of block copolymers by sequential addition of polymerizable monomers, see Example 5. For these types of polymerizations, Cu[I], Rh[I], and Ru[II] are preferred low valent metals and Cu[I] is especially preferred, and preferred monomers are styrenes and methacrylic-type compounds, and styrenes are especially preferred. For a discussion of "living" polymerizations see H. Mark, et al., Ed., Encyclopedia of Polymer Science and Engineering, Vol. 8, John Wiley & Sons, New York, 1968, p. 303–325, and H. Mark et al., Ed., Encyclopedia of Polymer Science and Engineering, 2nd Ed., Supplement Volume, John Wiley & Sons, New York, 1989, p. 429–437, both of which are hereby included by reference.

Often, the polymers produced herein have specific end groups, which are derived from the arylsulfonyl or alkylsulfonyl halide $A^1SO_2X$, wherein $A^1$ and X are as defined above. One end group on each polymer chain will be $A^1SO_2$— and the other end group will be —X. This means of course that of the total polymer end groups about half will be $A^1SO_2$— and the other half will be —X. Also the number $A^1SO_2$— end groups present in the polymer will be approximately equal to number of —X end groups present in the polymer.

In the Examples, the following abbreviations are used:
BA—n-butyl acrylate
BMA—n-butyl methacrylate
GPC—gel permeation chromatography
MMA—methyl methacrylate
Mn—number average molecular weight
Mw—weight average molecular weight
PMMA—poly(methyl methacrylate)
PS—polystyrene
THF—tetrahydrofuran

EXAMPLE 1

Two ml of styrene (0.0175 mol), 18 mg p-methoxybenzenesulfonyl chloride ($8.71 \times 10^{-5}$ mol), 3 mg of CuCl ($3.03 \times 10^{-5}$ mol) and 25 mg 4,4'-di-n-nonyl-2,2'-bipyridine ($6.13 \times 10^{-5}$ mol) were added to a 25 ml Schlenk tube, and the solution was degassed by 4 freeze-pump-thaw cycles, and then the tube was filled with argon and heated at 120° C. for 17 h. The polymerization was stopped and the viscous solution was analyzed by NMR (conversion to polymer was 67%) and GPC (Mn=15,4000, Mw/Mn=1.29, based on a PS standard). Theoretical Mn assuming a living polymerization was 14,000. The polystyrene was isolated by precipitation of a THF solution in methanol, filtration and drying under vacuum.

EXAMPLE 2

The same procedure is followed as in Example 1, except 1 ml of diphenyl ether is also added to the tube, and polymerization conditions were 120° C. for 60 h. The conversion to polymer was 98% (NMR) and the product polystyrene had an Mn of 20,600 and an Mw/Mn of 1.20 by GPC. Theoretical Mn was 20,400. The polystyrene was isolated by the same method as in Example 1.

EXAMPLE 3

To a 25 ml Schlenk tube were added 3.7 ml MMA (0.035 mol), 18 mg p-methoxybenzenefulsonyl chloride ($8.71 \times 10^{-5}$ mol), 3 mg CuCl ($3.03 \times 10^{-5}$ mol), and 25 mg 4,4'-di-n-nonyl-2,2'-bipyridine ($6.13 \times 10^{-5}$ mol), and the resulting solution was degassed by 4 freeze-pump-thaw cycles, and then the tube was filled with argon and heated at 120° C. for 50 h, when conversion was 98% by NMR. PMMA with Mn=40,300 and Mw/Mn=1.23 was obtained. Theoretical Mn was 39.380. The PMMA was isolated by precipitation of a THF solution into methanol, filtering and drying under vacuum.

EXAMPLE 4

The procedure of Example 3 was followed except that 1 ml of p-xylene was also added to the Schlenk tube, and the polymerization was carried out at 80° C. for 150 h, at the end of which time the conversion (by NMR) was 98%. The product PMMA had Mn=40,200 Mw/Mn=1.16. The PMMA was isolated by same method as in Example 3.

EXAMPLE 5

Example 2 is followed, and at the end of the polymerization reaction of styrene, a 0.1 ml sample is removed and analyzed. Conversion is 98% by NMR, and the polymer has an Mn=20,600 and Mw/Mn=1.20.

Then 3.7 ml of degassed MMA (0.035 mol) are added to the tube an mixed, and then the tube is heated for 6 days at 80° C., at the end of which time 98% (by NMR) of the MMA has been polymerized. The resulting block copolymer has Mn=60,100, Mw/Mn=1.3, and has a molar ratio of styrene:MMA of 1:2. Eight ml of THF were added to the polymerization mixture, and the polymer was precipitated by addition of this solution to methanol. The block copolymer was filtered and dried under vacuum.

EXAMPLE 6

The procedure of Example 2 was followed, except that 3.7 ml of MMA were also added to the Schlenk tube. Polymerization conditions were 180 h at 120° C. The conversion at that time was 98%. (Note—Conversion can be followed by NMR by removing samples periodically and analyzing them.) The random copolymer had Mn=60,000, Mw/Mn=1.3, and a styrene:MMA ratio of 1:2. Eight ml of THF were added to the polymerization mixture, and the polymer was precipitated by addition of this solution to methanol. The random copolymer was filtered and dried under vacuum.

EXAMPLES 7–12

Neat styrene was mixed with a first compound of the formula

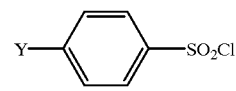

and CuCl/2,2'-bipyridine complex. The molar ratio of the first compound to the CuCl/2,2'-bipyridine complex was 1:1. The polymerization was allowed to proceed at 120° C. for the time indicated. Other polymerization conditions and results are given in Table 1. In addition for a polymer made in a similar manner as in Example 12, a 200 MHz $^1$H NMR spectrum clearly showed that the end groups for the polymer were p-methoxyphenyl-$SO_2$— and —Cl. This polymer had Mn=3920 and Mw/Mn=1.49.

TABLE 1

| Ex. No. | Initial Styrene/CuCl | Y | Time, h. | % Conv. | Mn, Found | Mn (Theoretical) | Mw/Mn |
|---|---|---|---|---|---|---|---|
| 7 | 37.8 | $NO_2$ | 72 | 16.0 | 1460 | 850 | 1.60 |
| 8 | 50.1 | H | 4.5 | 72.0 | 4900 | 3930 | 1.63 |
| 9 | 39.4 | F | 5 | 88.7 | 4300 | 3830 | 1.80 |
| 10 | 49.1 | Cl | 4 | 74.6 | 3900 | 4020 | 1.50 |
| 11 | 51.2 | $CH_3$ | 3.5 | 66.9 | 3750 | 3750 | 1.65 |
| 12 | 50.8 | $CH_3O$ | 2.5 | 56.1 | 4000 | 3170 | 1.48 |

EXAMPLE 13

A solution of 6.2 M MMA in xylene, also containing 1-naphthalenesulfonyl chloride, CuCl and 2,2'-bipyridine in the molar ratios MMA/1-naphthalenesulfonyl chloride/CuCl/2,2'-bipyridine 200/1/1/3 was made up and held at 90° C. After 4 h, 98% of the MMA was converted to PMMA.

EXAMPLE 14

A solution of 6.2 M MMA in xylene, also containing 2-naphthalenesulfonyl chloride, CuCl and 2,2'-bipyridine in the molar ratios MMA/2-naphthalenesulfonyl chloride/CuCl/2,2'-bipyridine 200/1/1/3 was made up and held at 90° C. After 3.3 h, 98% of the MMA was converted to PMMA.

EXAMPLE 15

A solution of 6.2 M MMA in xylene, also containing 5-(N,N-dimethylamino)1-naphthalenesulfonyl chloride, CuCl and 2,2'-bipyridine in the molar ratios MMA/5-(N,N-dimethylamino)1-naphthalenesulfonyl chloride/CuCl/2,2'-bipyridine 200/1/1/3 was made up and held at 90° C. After 6 h, 68% of the MMA was converted to PMMA.

EXAMPLE 16

A solution of 6.2 M MMA in xylene, also containing 2,5-dichlorobenzenesulfonyl chloride, CuCl and 2,2'-bipyridine in the molar ratios MMA, 2,5-dichlorobenzenesulfonyl chloride/CuCl/2,2'-bipyridine 200/1/1/3 was made up and held at 90° C. After 5.5 h, 96% of the MMA was converted to PMMA.

EXAMPLE 17

A solution of 6.2 M MMA in xylene, also containing 2,5-dimethoxybenzenesulfonyl chloride, CuCl and 2,2'-bipyridine in the molar ratios MMA/2,5-dimethoxybenzenesulfonyl chloride/CuCl/2,2'-bipyridine 200/1/1/3 was made up and held at 90° C. After 3.8 h, 90% of the MMA was converted to PMMA.

EXAMPLE 18

A solution of 4.9 M BMA in phenyl ether, also containing 4-carboxybenzenesulfonyl chloride, CuCl and 2,2'-bipyridine in the molar ratios MMA/4-carboxybenzenesulfonyl chloride/CuCl/2,2'-bipyridine 200/1/1/3 was made up and held at 120° C. After 8 h, 83% of the BMA was converted to polymer.

EXAMPLE 19

A solution of 3.16 M BA in phenyl ether, also containing 4-methoxybenzenesulfonyl chloride, CuCl and 4,4'-dinonyl-2,2'-bipyridine in the molar ratios MMA/4-methoxybenzenesulfonyl chloride/CuCl/4,4'-dinonyl-2,2'-bipyridine 200/1/0.3/0.42 was made up and held at 140° C. After 48 h, 60% of the BA was converted to polymer.

EXAMPLE 20

A solution of 6.25 M MMA in p-xylene, also containing 4-methoxybenzenesulfonyl chloride, CuCl and 4,4'-dinonyl-2,2'-bipyridine in the molar ratios MMA/4-methoxybenzenesulfonyl chloride/CuCl/4,4'-dinonyl-2,2'-bipyridine 100/1/03/0.42 was made up and held at 80° C. After 20 h, 40% of the MMA was converted to PMMA.

EXAMPLE 21

BMA (3 g, 21.1 mmol), phenyl ether, (1.4 M), methyl sulfonyl chloride (12 mg, 0.105 mmol), CuCl (10 mg, 0.105 mmol) and 2,2'bipyridine (49 mg, 0.315 mmol) were weighted directly in a 25 ml Schlenk tube. The mixture was degassed by four freeze-pump-thaw cycles, filled with Ar and heated at 120° C. for 1 hour. A sample was diluted with $CDCl_3$ in NMR tube and the conversion was determined by $^1$H-NMR spectroscopy to be 95%. Then, part of the solution was filtered and injected in a GPC column eluted with THF (tetrahydrofuran) and the molecular weight was measured versus PMMA standards using a RI detector. The polymer has $M_n$=24,000, $M_{th}$, =25,000 and $M_w/M_n$=1.27.

EXAMPLE 22

BMA (3 g, 2.1 mmol), phenyl ether (1.4 M), 4-methoxy benzeone sulfonyl chloride, (21.6 mg, 0.104 mmol), cuprous oxide (15 mg 0.104 mmol) and 2,2'bipyridine (33 mg, 0.211 mmol) were weighted directly in a 25 ml Schlenk tube. The mixture was degassed by four freeze-pump-thaw cycles, filled with Ar and heated at 120° C. for 5 hours. A sample was diluted with CDCl3 in NMR tube and the conversion was determined by $^1$H-NMR spectroscopy to be 90%. Then, part of the solution was filtered and injected in a GPC column eluted with THF and the molecular weight was measured versus PS standards using a UV detector. The polymer has $M_n$=22,000, $M_{th}$=25,000 and $M_w/M_n$=1.14.

EXAMPLE 23

BMA (3 g, 21.1 mmol) phenyl ether (1.4M), 4-methoxy benzene sulfonyl chloride, (21.6 mg, 0.104 mmol), Cu metal powder (a Cu wire or film can also be used), [3.4 mg, 0.053 mmol] and 2,2'bipyridine (16 mg, 0.11 mmol) were weighted directly in a 25 ml Schlenk tube. The mixture was degassed by four freeze-pump-thaw cycles, filled with Ar and heated to 120° C. for 2 hours. A sample was diluted with $CDCl_3$ in NMR tube and the conversion was determined by $^1$H-NMR spectroscopy to be 97%. Then, part of the solution was filtered and injected in a GPC column eluted with THF and the molecular weight was measured versus PS standards using a UV detector. The polymer has $M_n$=27,000 $M_{th}$=27,600 and $M_w/M_n$=1.24.

What is claimed is:

1. A process for the polymerization of vinyl monomers other than styrene monomers, comprising, contacting a free radically polymerizable vinyl monomer with a first compound of the formula $A^1SO_2X$ and a second compound which contains a transition metal atom in a lower valent state, wherein $A^1$ is an aryl, substituted aryl, alkyl or substituted alkyl group, and X is chlorine, bromine or iodine.

2. The process as recited in claim 1 wherein said transition metal atom is Cu[I], Ru[I], Ni[II], Fe[II], Pd[II] or Rh[II].

3. The process as recited in claim 1 wherein said transition metal atom is and Cu[I], Ru[I] or Rh(II).

4. The process as recited in claim 1 wherein said transition metal Cu[I].

5. The process as recited in claim 1 wherein said transition metal compound is a CuCl-2,2'bipyridine complex.

6. The process as recited in claim 1 wherein said monomer is a compound of the formula

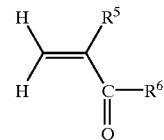

wherein $R^5$ is hydrogen or methyl and $R^6$ is —$NR^7R^8$ or —$OR^9$, $R^7$ and $R^8$ are each independently hydrogen, hydrocarbyl or substituted hydrocarbyl, and $R^9$ is hydrocarbyl or substituted hydrocarbyl.

7. The process as recited in claim 6 wherein $R^7$ and $R^8$ are each independently hydrogen or alkyl containing 1 to 10 carbon atoms or $R^9$ is alkyl containing 1 to 10 carbon atoms.

8. The process as recited in claim 1 wherein $A^{11}$ is phenyl or substituted phenyl and X is chlorine.

9. The process as recited in claim 1 wherein X is chlorine.

10. The process as recited in claim 1 carried out at a temperature of about 0° C. to about 200° C.

11. The process as recited in claim 1 carried out at a temperature of about 75° C. to about 150° C.

12. The process as recited in claim 3 wherein a polymer produced has Mw/Mn=2, and a molar ratio of said first compound:said second compound is greater than about 0.2.

13. The process as recited in claim 3 wherein a block copolymer is produced by sequential addition of monomers, and a ratio of said first compound:said second compound is greater than about 0.2.

14. The process as recited in claim 1 wherein a homopolymer is produced.

15. The process as recited in claim 1 wherein a random or alternating copolymer is produced.

16. The process as recited in claim 1 wherein a ratio of said first compound:said second compound is greater than about 0.2.

17. The process as recited in claim 1 wherein a ratio of said first compound:said second compound is greater than about 0.5, and less than about 5.

18. The process as recited in claim 1 wherein a random copolymer is produced.

* * * * *

UNITED STATES PATENT AND TRADEMARK OFFICE
CERTIFICATE OF CORRECTION

PATENT NO.   : 6,284,850 B1
DATED        : September 4, 2001
INVENTOR(S)  : Percec Virgil It is certified that error appears in the above-identified patent and that said Letters Patent is hereby corrected as shown below:

Column 9,
Line 14, "Mw/Mn=2," should read -- Mw/Mn<2, --

Signed and Sealed this

Seventh Day of September, 2004

JON W. DUDAS
*Director of the United States Patent and Trademark Office*